UNITED STATES PATENT OFFICE.

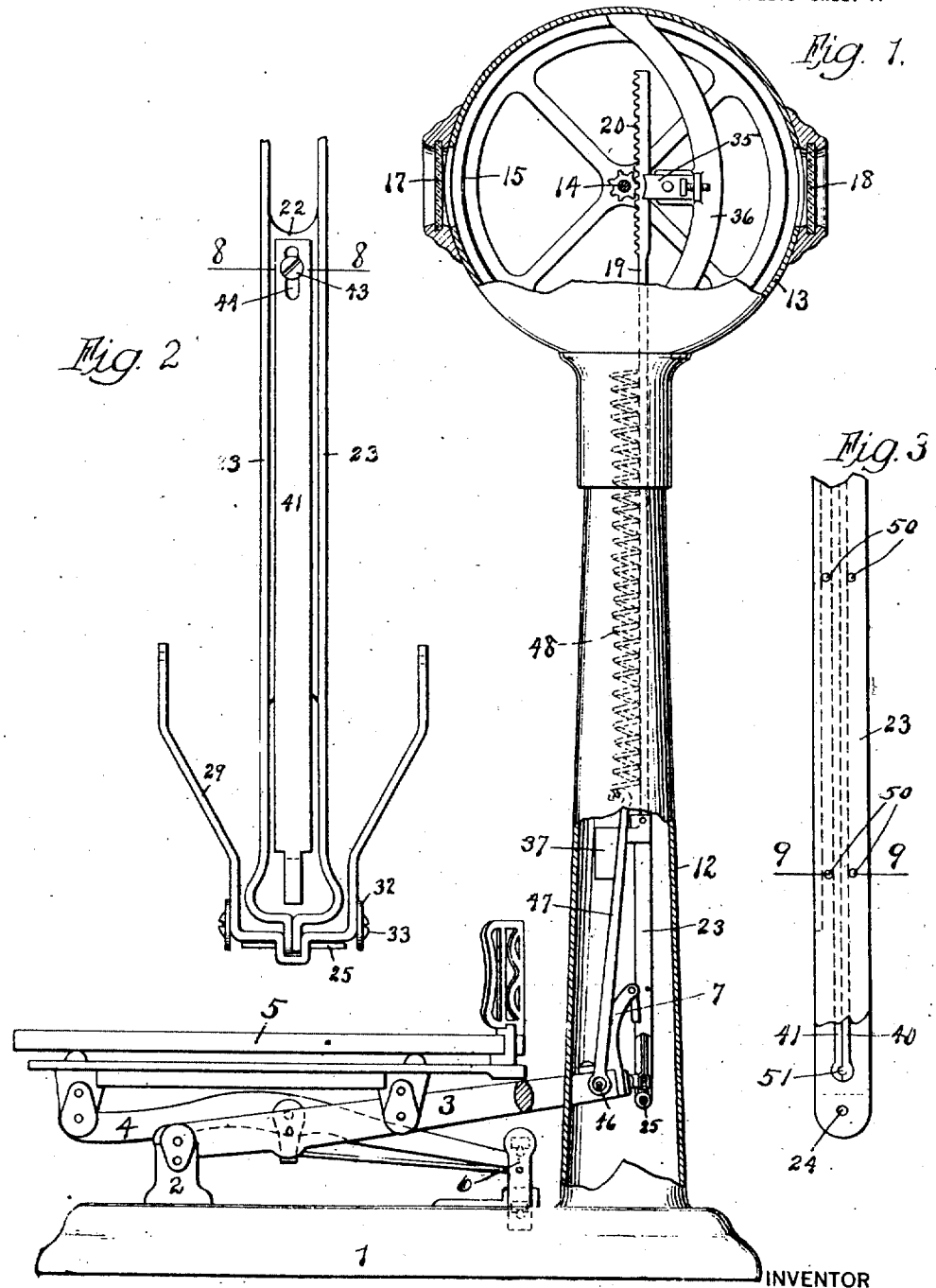

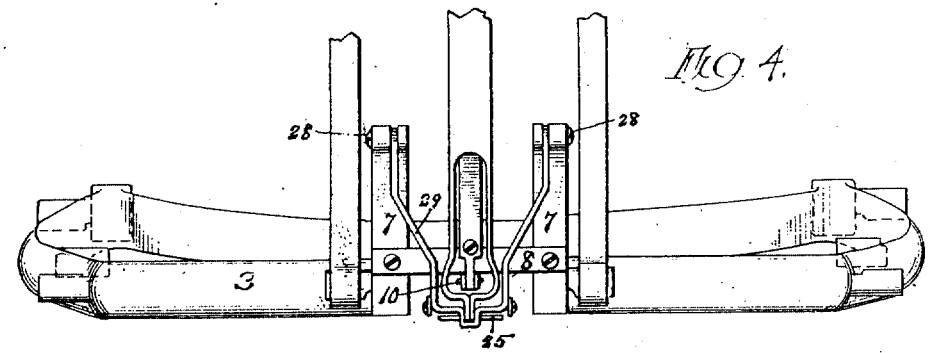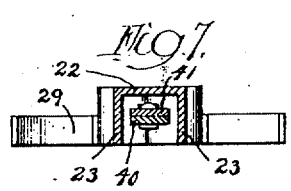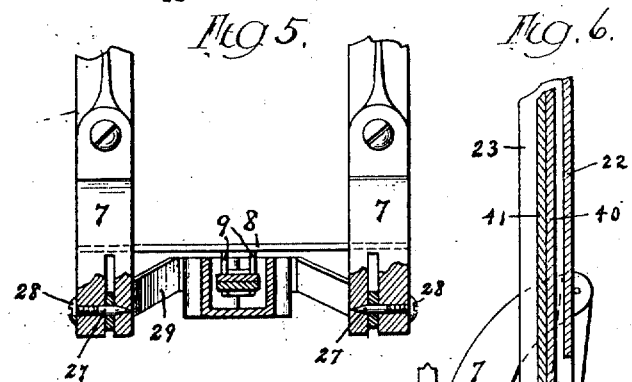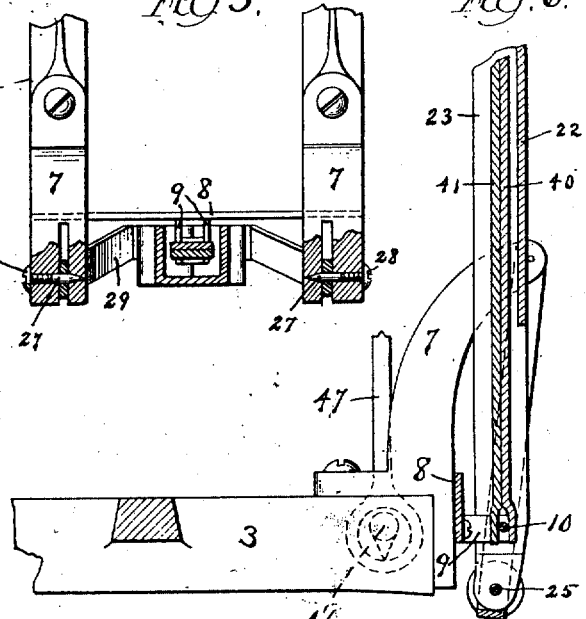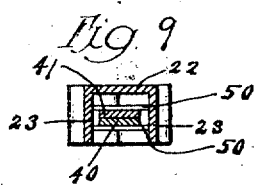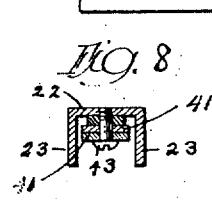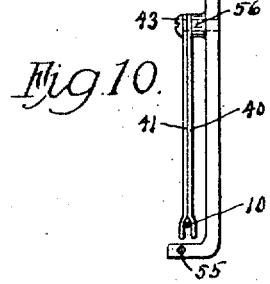

LOUIS JAENICHEN, OF DETROIT, MICHIGAN, ASSIGNOR TO THE STANDARD COMPUTING SCALE COMPANY, OF DETROIT, MICHIGAN, A CORPORATION OF MICHIGAN.

THERMOSTAT FOR SCALES.

1,231,026.

Specification of Letters Patent.

Patented June 26, 1917.

Application filed February 19, 1917. Serial No. 149,407.

*To all whom it may concern:*

Be it known that I, LOUIS JAENICHEN, a citizen of the United States, and residing at Detroit, in the county of Wayne and State of Michigan, have invented a new and Improved Thermostat for Scales, of which the following is a specification.

This invention is embodied in scales for grocers and other merchants, of the general type shown in the Buckingham Patent Number 967,880, dated August 23, 1910, and its object is to provide a scale of that general type with means to overcome the errors which arise because of the changes in the stiffness of the load-resisting springs due to changes in temperature. A further object of this invention is to provide means for changing the leverage between the load receiving mechanism and the weight indicating mechanism to compensate for the variations in the load-resisting mechanism because of the changes in temperature.

This invention consists in combination with the lever mechanism and the load-resisting mechanism of a scale, of a base on which said mechanisms are supported, of a pedestal mounted on the base, a weight indicating mechanism supported by said pedestal, a weight-indicator actuating rod, and means including a thermostat connecting this rod with the lever mechanism. It further consists in a novel linkage between the end of the main lever of the scale and the weight-indicator actuating rod, and a thermostat mounted on the rod and connecting to the main lever adjacent the said linkage for causing the adjacent end of said rod to swing back and forth relative to said lever and thereby modify the operative lever arm connected to the rod. It further consists in the details of construction shown in the accompanying drawings and particularly pointed out in the claims.

In the accompanying drawings, Figure 1 is a side elevation of a scale embodying this improved device. Fig. 2 is a front elevation of the lower end of the rod that actuates the weight indicator and of the linkage connecting the said rod to the end of the main lever. Fig. 3 is a side elevation of a modification of the thermostat. Fig. 4 is a rear elevation of the main lever of the scale and of the mechanism connected to the rear end thereof. Fig. 5 is a plan of the rear end of the main lever and a cross section of the lower end of the weight indicator operating rod. Fig. 6 is a longitudinal vertical section of the lower end of the thermostat. Fig. 7 is a plan of the link which connects the lower end of the weight indicator operating rod to the main lever. Fig. 8 is a section on the line 8—8 of Fig. 2. Fig. 9 is a section on the line 9—9 of Fig. 3. Fig. 10 is a side elevation of still another construction of thermostat.

Similar reference characters refer to like parts throughout the several views.

It is well known that in spring scales on account of the load-resisting springs becoming weaker with increasing temperatures the weight indicator will indicate greater weights with higher temperatures than with lower, unless means are provided to compensate for the weakening of the springs with increasing temperatures. In the present scale this difficulty is overcome by causing the weight-indicating mechanism to travel through equal distances in spite of varying temperatures for equal increments of load on the load-resisting spring or springs, notwithstanding the unequal expansion of said springs. It will be evident that the type of scale shown in the drawings is merely an example and that the invention is not limited to scales of this particular type.

The construction shown in the drawings has a base 1 which carries a pedestal 2 on which the main lever 3 is mounted. The secondary lever 4 is mounted intermediate its ends on this main lever and the thrust received from the platform 5 by this secondary lever is counterbalanced by a link 6 connected to the base 1, all as fully explained in the Buckingham patent mentioned above. The rear end of the main lever 3 has secured to it the arms 7 and the small cross bar 8, which carries the ears 9 through which extends the pin 10.

Mounted on the base 1 is a pedestal 12 of any desired type which pedestal carries the shell 13 in which is rotatable the shaft 14, that carries the weight-indicating drum 15, and a small pinion 16. The indications on the drum may be read through the glass windows 17 and 18 at the front and rear of the shell. The vertically movable rod 19 has rack teeth 20 at its upper end engaging the small pinion 16, and its lower end is in the form of the channel shown in Fig. 2, having a back 22 and sides 23. The back 22 is of less length than the channel, the sides 23 being bent together at their lower ends and formed with a hole to receive the pin 25.

As shown in Fig. 5, the upper ends of the arms 7 are drilled to receive the pins 27 which are held in position by the screws 28. On these pins 27 are mounted the ends of the stirrup 29 whose lower middle portion is bent to U shape and which receives the pin 25. The washers 32 are held in position by the screws 33 to prevent the pin 25 from moving endwise out of its position in the stirrup 29. It will therefore be seen that the operating rod 19 for the weight indicator is supported by the stirrup 29 and is caused to move down to turn the drum 15 as the rear end of the lever 3 is moved down by a load on the platform 5. In order to cause proper engagement between the rack teeth 20 and pinion 16, a guide 35 is mounted on the bar 36 which guide may be positioned as shown in Fig. 1. As a further factor of safety a small weight 37 may be mounted to extend forwardly from the indicator rod 19 and thus serve to hold the rack-teeth 20 in engagement with the pinion 16. If desired either one of these devices may be omitted.

Mounted on the rod 19 and engaging the pin 10 carried on the rear end of the main lever is a thermostat made up of two strips of metal 40 and 41, the latter of steel or other material having a low coefficient of expansion, and the former a strip of brass or other material having a higher coefficient of expansion. In Fig. 2, this thermostat is shown secured to the back 22 of the channel constituting the lower end of the rod 19 by means of the screw 43 that extends through the slot 44 in the thermostat. This slot permits perfect adjustment of the thermostat but may be omitted if desired. The two materials constituting the thermostat will be connected together their entire length in any desired manner, electric welding preferred. The lower ends of these two materials are separated, as shown in Fig. 6, to form a fork that extends over the pin 10 carried by the ears 9 on the rear end of the main lever 3. The main lever carries a pair of knife edges 46 which are engaged by means of links 47 that extend up and connect with the main load-resisting springs 48.

The operation of this scale is as follows. The load on the platform 5 causes a depression of the rear end of the main lever 3 and is restrained through the action of the links 47 and springs 48. This downward movement of the rear end of the main lever 3 causes the arms 7 thereon to push down the stirrup 29 and with it the lower end of the rod 19 which causes the drum 15 to turn through distances predetermined for the weight placed upon the platform. As the temperature rises the springs 48 become weaker and the distance through which the main lever 3 swings for equal loads will increase. As the temperature increases, the thermostat bends rearwardly at its lower end relative to the lower end of the operating rod 19. As the upper end of the thermostat is rigidly connected with this operating rod, the result of this rearward movement of the lower end of the thermostat will be to move the lower end of the operating rod forwardly, thus decreasing the lever arm which actuates this indicator-operating rod. When the thermostat is properly proportioned the amount of reduction of the length of the lever arm actuating the operating rod will be proportioned to the increase in extension of the springs because of the increase of temperature, so that the amount of rotation of the drum 15 will be constant for equal weights upon the platform 5 irrespective of the temperature.

As shown in Fig. 6, the forward movement of the lower portion of the stirrup 29 will cause the pin 25 to rise relative to the arms 7. This compensates for the initial expansion of the springs 48 due to increased temperature.

Instead of providing the thermostat with a fork at its lower end to permit the thermostat to move up and down relative to the pin 10, this connection between the two may be fixed and the thermostat may be permitted to move up and down relative to the rod. This construction is shown in Figs. 3 and 9. In these figures the pins 50 extend across between the sides 23 of the channel portion of the lower end of the rod 19 and the thermostat is slidable up and down between these pins. A hole is formed in the lower end of each side 23. The lower end of the thermostat is formed with a hole 51 through which the pin 10 may extend. The operation of this thermostat is identical with that just described.

The reason for using the upwardly projecting arms 7 on the main lever 3 is to provide for long arms of the stirrup 29 which will cause no more vertical movement of the pin 25 than is necessary to compensate for the initial expansion and contraction of the springs while the middle portion of the stirrups swings forward or backward.

In Fig. 10, the rod 19 is shown to be flat-sided and to have its lower end bent forward and provided with a hole 55 to receive the pin 25. The thermostat is secured to the boss 56 on this rod, by means of the screw 43 as indicated in Fig. 2. In all respects the thermostats shown in Figs. 2 and 10 are alike and operate in the same manner.

I claim:—

1. In a computing scale, the combination of a base, a lever mounted thereon, a load-receiving platform connected to the lever, a pedestal mounted on the rear end of the base, a shell mounted on the upper end of the pedestal, an indicating drum revolubly mounted within said shell, a rod longitudinally movable within said pedestal to actuate said drum, a stirrup pivotally connected to the rear end of the lever, a pin connecting the lower end of said rod to said stirrup, and a thermostat mounted on said rod and engaging said lever to swing the lower end of said rod toward the fulcrum of said lever as the temperature increases and away from the fulcrum as the temperature decreases.

2. In a scale, the combination of a base, a load-receiving lever fulcrumed thereon, a weight-indicating mechanism, a rod connected to said weight-indicating mechanism, a stirrup pivotally mounted on the lever, means to pivotally connect said stirrup to said rod, and a thermostat mounted on said rod and engaging said lever and adapted to swing the lower end of the rod toward and from the fulcrum of said lever.

3. In a scale, the combination of a base, a load-receiving lever mounted thereon, a pedestal mounted on said base, a drum revolubly mounted on the pedestal, a drum-actuating rod movable within said pedestal, a load-resisting spring connected to said lever, means for movably connecting the lower end of said rod to said lever and a thermostat mounted on said rod and engaging said lever and adapted to move the lower end of said rod toward and from the fulcrum of the lever.

4. In a scale, the combination of a base, a load-receiving lever mounted on said base, a pedestal mounted on said base, a weight-indicating mechanism carried by the pedestal, a rod movable to actuate said weight indicator, means pivoted to the lower end of said rod and to said lever and adapted to support said rod and move the same up and down with the adjacent end of said lever, and a thermostat mounted on said rod and engaging the adjacent end of said lever and adapted to move the lower end of said rod toward and from the fulcrum of said lever.

5. In a scale, the combination of a base, a load-supporting lever mounted thereon, a pedestal mounted on said base, a weight indicator on said pedestal, a rod movable to actuate said indicator, a pair of upwardly extending arms mounted on the rear end of said lever and having pivots at their upper ends, a stirrup pivotally mounted at the upper ends of said arms and having its middle portion suspended downwardly from said pivots, a pivot pin connecting the lower end of said indicator-operating rod to the middle portion of said stirrup whereby said rod may be caused to move up and down with the rear end of said lever, a pin mounted on said lever below said arms, a thermostat secured to said rod and having a fork at its lower end engaging said last named pin and by means of which the lower end of said rod may be swung back and forth from the fulcrum of said lever.

6. In a scale, the combination of a base, a load-receiving lever fulcrumed thereon, a weight-indicating mechanism above said base, a rod connected to said weight indicator, a stirrup pivotally connected to said lever and to the lower end of the rod, and a thermostat connected to said rod and consisting of two flat bars normally substantially parallel with the rod and engaging the lever adjacent to said rod.

7. In a scale, the combination of a base, a load-receiving lever fulcrumed thereon, a weight-indicating mechanism above said base, an upright rod connected to said weight indicator and being in the form of a channel at its lower end, a stirrup pivotally connected to said lever and to the lower end of the rod, and a thermostat connected to said rod and consisting of two flat bars normally parallel with the rod and engaging the lever adjacent to said rod.

LOUIS JAENICHEN.